(12) United States Patent
Fujii

(10) Patent No.: US 7,477,872 B2
(45) Date of Patent: Jan. 13, 2009

(54) AUTOMATIC TUNING SYSTEM FOR A MOBILE DVB-T RECEIVER

(75) Inventor: Kyoichiro Fujii, Stoke (GB)

(73) Assignee: Pioneer Digital Design Centre Ltd, Stoke Poges (GB)

( * ) Notice: Subject to any disclaimer, the term of this patent is extended or adjusted under 35 U.S.C. 154(b) by 721 days.

(21) Appl. No.: 11/147,175

(22) Filed: Jun. 8, 2005

(65) Prior Publication Data

US 2005/0278752 A1   Dec. 15, 2005

(30) Foreign Application Priority Data

Jun. 9, 2004   (GB)   ................... 0412881.5

(51) Int. Cl.
  *H04Q 7/20*   (2006.01)
(52) U.S. Cl. ............... 455/3.01; 455/3.03; 455/3.04; 455/3.06; 455/422.1; 455/456.1; 725/38; 725/49; 725/52; 725/62; 725/106; 342/357.06; 342/357.01; 342/357.09; 342/357.12; 342/357.13
(58) Field of Classification Search ........... 455/3.01, 455/3.03, 3.04, 3.06, 422.1, 403, 500, 517, 455/343, 73, 466, 414.1, 414.2, 550.1, 552.1, 455/67.11, 426.1, 426.2, 513, 509, 456.1–457, 455/186.1; 725/38, 49, 52, 62, 106, 151; 342/357.01, 357.06, 357.09, 357.12, 357.13
See application file for complete search history.

(56) References Cited

U.S. PATENT DOCUMENTS

| | | | |
|---|---|---|---|
| 6,282,412 B1* | 8/2001 | Lyons | 455/186.1 |
| 6,321,077 B1* | 11/2001 | Saitoh et al. | 455/345 |
| 2007/0015546 A1* | 1/2007 | Ito | 455/566 |

* cited by examiner

Primary Examiner—Keith T Ferguson
(74) Attorney, Agent, or Firm—Sughrue Mion, PLLC

(57) ABSTRACT

An automatic tuning system for a mobile DVB-T (Digital Video Broadcasting-Terrestrial) receiver includes a position detecting system, a plurality of tuners, a plurality of demodulators configured to process DVB-T signals, each of which is paired with one of the plurality of tuners, for demodulating each of the signals received by each of the tuners and comparing the strengths of the signals. A database sets a frequency code relating to the optimum frequency found by the demodulators, to an area-cell code relating to the receiver position, in a processor. The processor controls the automatic tuning system on the basis of the stored frequency codes and current position data from the position detecting system.

17 Claims, 2 Drawing Sheets

Example of the block diagram for the idea of PDD-000003

AUTOMATIC TUNING SYSTEM FOR A MOBILE DVB-T RECEIVER

BACKGROUND

1. Field of the Invention

The present invention relates to a system for automatically tuning a receiver for a DVB-T (Digital Video Broadcasting-Terrestrial) system.

The use of digital broadcasting is currently growing in popularity throughout the world, as it offers a wide choice of channels and superior video and audio quality compared to that of analogue signal broadcasting.

In the case where the DVB-T receiver of a digital broadcasting system is mobile, it is necessary to ensure that the receiver has constant access to the highest quality signal available for the particular service required. In most of continental Europe, for example, a DVB-T transmission system known as "Single Frequency Network" (SFN) transmission is adopted, in this system a user travelling between different areas does not have to re-tune the frequency of the service required, as this is the same for all areas even if they are covered by different transmitters. By contrast, countries such as the United Kingdom apply a transmission system known as "Multi Frequency Network" (MFN) transmission, and with this system the user has to re-tune the receiver during the journey in order to continue to receive the optimum signal quality available.

Re-tuning in this way is necessary with the MFN transmission system, as the total area for which the service is available is split into "area-cells", each of which constitutes the area covered by one DVB-T transmitter A number of DVB-T transmitters are therefore used to transmit a service to various different areas defined by the area-cells Previous MFN transmission systems therefore present a problem, in that a user moving from one area-cell to another must re-tune the DVB-T receiver to a new frequency in order to continue to receive the same service, as the transmission frequency of the service varies from one area-cell to another. This re-tuning is inconvenient and can be difficult to achieve.

BRIEF SUMMARY

The present invention seeks to overcome the above problems by providing a system and method for automatically re-tuning a mobile DVB-T receiver when a user moves from one area-cell to another.

According to the present invention there is provided an automatic tuning system for a mobile DVB-T receiver, the system comprising:
a position detecting system;
a plurality of tuners,
a plurality of demodulators configured to process DVB-T signals, each of which is paired with one of the plurality of tuners, for demodulating each of the signals received by each of the tuners and comparing the strengths of the signals; and
a database for setting a frequency code relating to the optimum frequency found by the demodulators, to an area-cell code relating to the receiver position, in a processor,
wherein the processor controls the automatic tuning system on the basis of the stored frequency codes and the current position data from the position detecting system.

The present invention further provides a method of automatically tuning a mobile DVB-T receiver, the method comprising the steps of:
determining the position of the receiver using a position detecting system,
receiving a plurality of signals containing digital broadcast data, via a plurality of tuners;
demodulating the received signals via a plurality demodulators configured to process DVB-T signals, each of which is paired with one of the plurality of tuners;
comparing the strengths of the frequencies of the received signals;
storing codes relating to an optimum frequency and the receiver position in the database; and
tuning the receiver to the optimum received frequency,
wherein the automatic tuning system is controlled by a processor on the basis of the stored frequency codes and the current position data from the position detecting system.

The automatic tuning system may be employed in a DVB-T receiver which further comprises;
a demultiplexer; digital audio and video decoders;
analog audio and video encoders;
a display; and
a speaker.

The present invention employs a positioning system, such as GPS, and one or more tuners in a mobile DVB-T receiving system in order to use digital broadcast data to determine which transmitter to switch to. The digital broadcast data is therefore used in assessing the frequency at which an optimum signal can be received for a specific digital service.

The position detecting system of the automatic tuning system may be a global positioning system.

The automatic tuning system may operate using radio frequency signals, intermediate frequency signals or baseband signals.

Comparing the signals to find the optimum frequency provides an efficient way of finding the frequency at which the strongest signal for a particular DVB-T service is available, and the system can then seamlessly re-tune to this frequency By storing the frequency codes and corresponding area-cell codes in a database, the information can be recalled automatically in the future. The present invention allows for a seamless transition between optimal frequencies of different area-cells, and there is therefore no need for a user to re-tune the DVB-T receiver. Additionally, any disturbance to the service is minimised.

BRIEF DESCRIPTION OF THE DRAWINGS

An example of the present invention will now be described in detail with reference to the drawings, in which.

DETAILED DESCRIPTION

Figure 1:
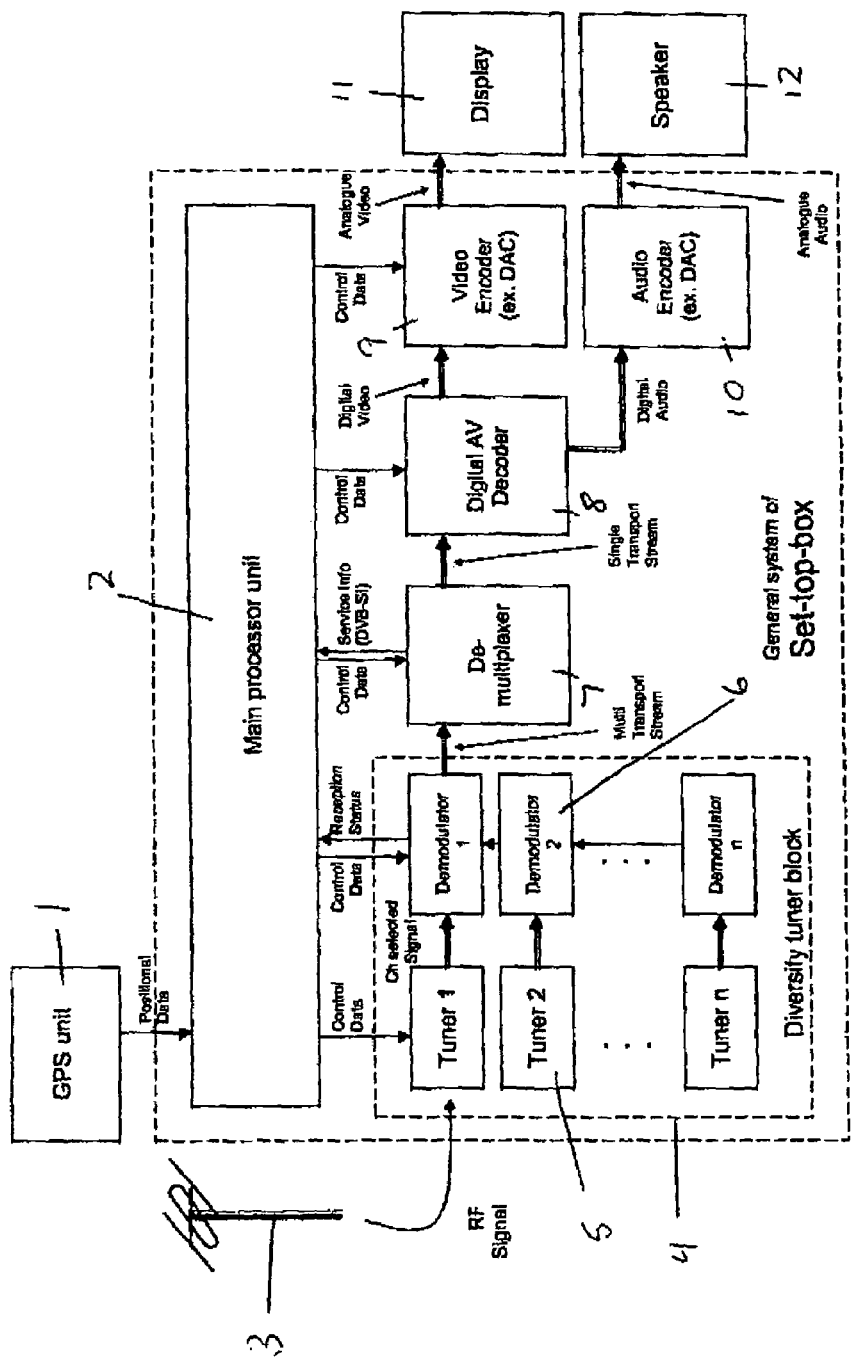
FIG. 1 is a block diagram of a digital broadcast system employing the automatic tuning system of the present invention.

Referring to FIG. 1, an example of the invention is employed in a DVB-T receiver system which employs a global positioning system (GPS) unit 1, in order to provide positional data to a central processing unit (CPU) 2 which controls the receiver system. The receiver system is generally housed in a single housing so that all of the components of the system are provided in a single, portable device.

Use of the GPS unit 1 allows the system to accurately assess the position of the receiver, so that this can then be related to the frequency of an RF signal being received by antenna 3. A tuning block 4 comprises a number of tuners 5, together with a number of corresponding demodulators 6, each of which is connected to one of the tuners 5 and its neighbouring demodulators. When a DVB-T standard signal is received, each tuner acts as a band-pass filter and passes an output signal, which may be in the form of an RF, IF or baseband signal, and which has a certain frequency and bandwidth, to its corresponding demodulator 6.

The tuning block 4 has a number of tuners and demodulators in order to perform a "diversity reception" function on the incoming RF signal. The diversity reception process occurs as follows. Each demodulator 6, which is configured to process DVB-T signals, coverts the waveform signal which it receives from the output of its corresponding tuner into a multi transport datastream, in order to create a set of data based on the DVB signal information Multiple pairs of tuners and demodulators are provided in order that the optimum signal quality can be found. For example, in a set of n pairs of tuners 5 and demodulators 6, the qualities of the demodulated signals produced by demodulator n and demodulator n-1 are compared by demodulator n-1 The stronger or higher quality signal is then sent to demodulator n-2, which performs the same function by comparing its demodulated signal to that of demodulator n-1.

The reception condition at each demodulator 6 is collected by the CPU 2 by collecting the result of each of these comparisons. This therefore allows the CPU 2 to assess the correct frequency required for the current area-cell, in order to continue to receive a specified previously received service with the best possible reception. A list of area-cells and the frequencies for a desired service used in that cell may be stored in a Network Information Table (NIT) that is used to describe information used in a terrestrial network. Frames of information corresponding to the identities of each individual area-cell, together with those corresponding to the best available frequency used in that area-cell can therefore be stored in this database, also known as a "cell frequency link descriptor". In the present invention, the optimum frequency found by the demodulators is stored with its corresponding area-cell, so that when returning to this area-cell in the future, the receiver system will know to automatically re-tune the receiver to this frequency for the current service, without having to perform the automatic diversity reception process again The multi transport stream output by the demodulator 6 is then passed to a demultiplexer 7, which effectively acts as a filter on the multiplexed stream and selects one or more streams which pass to a digital audio/visual decoder 8. As well as selecting certain transport streams, the demultiplexer 7 collects DVB service information (DVB-SI) from the demodulated signal, and sends this to the CPU 2, where it is used to improve the tuning function of the CPU 2. The audio/video decoder 8, generally referred to as an MPEG decoder, has to expand the compressed audio and video information in the transport stream which it receives The digital video and audio data are then separated and are passed to a video encoder 9 and audio encoder 10, respectively. Alternatively, functions such as SPD audio and video coders could be used, or a direct digital audio/video source output may be employed. In the example where the encoders are used, the analog video and audio data are output to a display 11 and speaker 12, respectively, thereby providing the user with the desired service. Alternatively, other output devices such as a video cassette recorder (VCR) could be employed.

Figure 2:
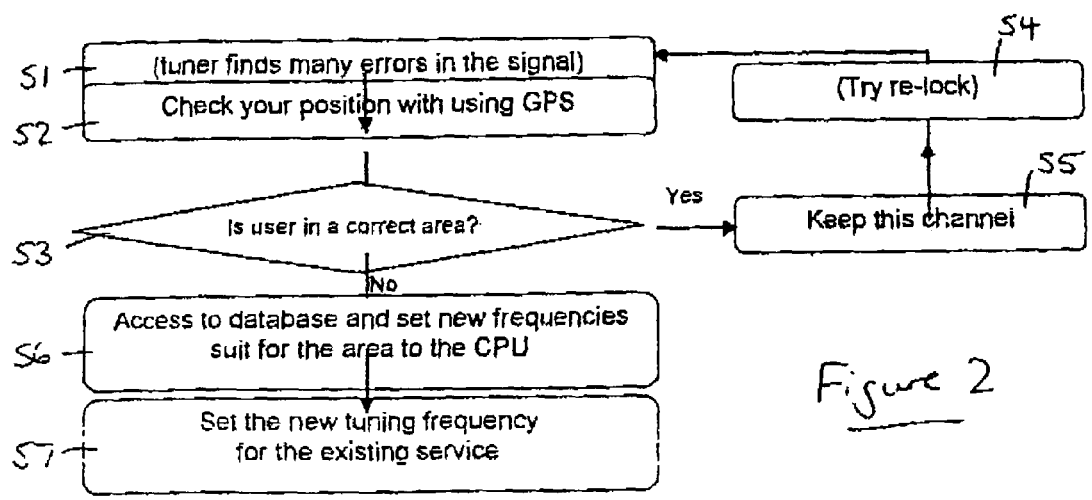
FIG. 2 shows a flow chart of the method employed by the automatic tuning system of the present invention.

Referring now to FIG. 2, when errors begin to occur in the signal being received by a tuner (step S1), the GPS unit 1 is employed to verify the location of the receiver at step S2. At step S3, the system asks whether the receiver is in a suitable area to be receiving the service at the current signal frequency. If the receiver is deemed to be within the correct area-cell for the frequency which has been received, the system retains this channel at step S4, and tries to re-lock the signal at step S5. If, however, the receiver is found to be outside the area in which the signal being received is the highest quality signal available, that is, the receiver has been moved into an area-cell in which a signal at a different frequency is found by the system to be of a higher quality, the system will employ the diversity reception process. At step S6, the database will be accessed and identity codes will be set for the new frequencies which correspond to the new area-cell. The optimum frequency for the existing service will then be set by the system at step S7.

The present invention allows for a seamless transition between optimal frequencies of different area-cells, via an automatic re-tuning system. There is therefore no need for a user to re-tune the DVB-T receiver, and any disturbance to the service is minimised.

The invention claimed is:

1. An automatic tuning system for a mobile DVB-T (Digital Video Broadcasting-Terrestrial) receiver, the system comprising:
   a position detecting system;
   a plurality of tuners;
   a plurality of demodulators configured to process DVB-T signals, each of which is paired with one of the plurality of tuners, for demodulating signals received by each of the tuners and comparing the strengths of the signals to find an optimum frequency, and
   a database for setting a frequency code relating to the optimum frequency found by the demodulators, to an area-cell code relating to the receiver position, in a processor,
   wherein the processor controls the automatic tuning system on the basis of the stored frequency codes and current position data from the position detecting system.

2. The automatic tuning system of claim 1, wherein the position detecting system is a global positioning system.

3. The automatic tuning system of claim 2, wherein the system operates using RF, IF or baseband signals.

4. The automatic tuning system of claim 1, wherein the system operates using RF, IF or baseband signals.

5. The automatic tuning system of claim 1, wherein the turners and demodulators are housed within a tuning block.

6. The automatic tuning system of claim 1, wherein the database is a cell frequency link descriptor in the form of a network information table.

7. The automatic tuning system of claim 1, wherein the system is employed in a DVB-T receiver which further comprises:
   a display;
   a speaker;
   a demultiplexer configured to receive and demodulate a multi-transport stream output from the plurality of demodulators;
   digital audio and video decoders configured to decode an output signals from the demultiplexer; and
   analog audio and video encoders configured to encode the signals output from the digital and video decoders for driving the display and speaker.

8. A method of automatically tuning a mobile DVB-T (Digital Video Broadcasting-Terrestrial) receiver using an automatic tuning system, the method comprising the steps of:
   determining the position of the receiver using a position detecting system;
   receiving a plurality of signals containing digital broadcast data, via a plurality of tuners;

demodulating the received signals via a plurality of demodulators configured to process DVB-T signals, each of which is paired with one of the plurality of tuners, comparing the strengths of the received signals to determine a signal having an optimum frequency;

storing codes relating to the optimum frequency and the receiver position in the database.

9. The method of claim 8, wherein the position detecting system is a global positioning system.

10. The method of claim 9, wherein the automatic tuning system operates using RF, IF or baseband signals.

11. The method of claim 8, wherein the automatic turning system operates using RF, IF or baseband signals.

12. The method of claim 8, wherein the tuners and demodulators are housed within a tuning block.

13. The method of claim 8, wherein the database is a cell frequency link descriptor in the form of a network information table.

14. The method of claim 8, further comprising tuning the receiver to the optimum frequency, wherein the automatic tuning system is controlled by a processor on the basis of the stored frequency codes and current position data from the position detecting system.

15. The method of claim 8, wherein the optimum frequency is the frequency of the strongest signal received by the tuners.

16. The method of claim 8, wherein the optimum frequency is the frequency of the highest quality signal received by the tuners.

17. The method of claim 8, wherein each of the plurality of tuners outputs a received signal to the demodulators, wherein the received signal is an RF, IF or baseband signal.

* * * * *